Patented May 4, 1926.

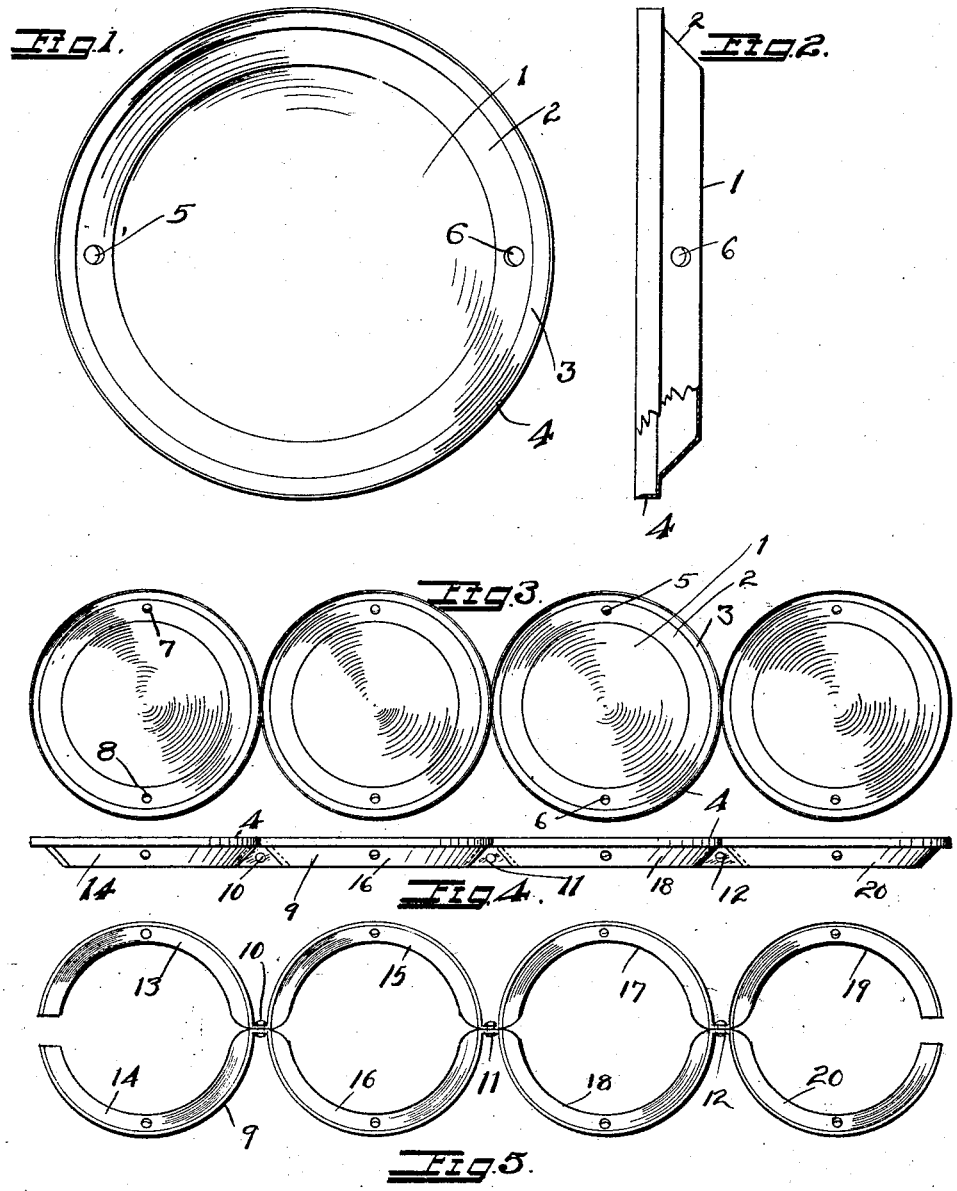

1,583,523

UNITED STATES PATENT OFFICE.

FRED S. BRISCOE, OF SAN FRANCISCO, CALIFORNIA.

PIE PAN.

Application filed January 7, 1925. Serial No. 1,104.

*To all whom it may concern:*

Be it known that I, FRED S. BRISCOE, a citizen of the United States, residing at San Francisco, in the county of San Francisco, State of California, have invented a new and useful Pie Pan, of which the following is a specification in such full and clear terms as will enable those skilled in the art to construct and use the same.

This invention relates to a pie pan especially intended for bakers to facilitate the rapid manufacture of pies in bakeries, and its object is to provide for cutting the rolled out dough quickly.

Another object of the invention is to provide means whereby a series of such pans may be connected together to enable a number of the pies to be handled at one time, and to enable a number of the pies to be made at one time, the cut off pieces of dough dropping upon the table when the pies are made.

Other objects of the invention will appear as the description proceeds.

An embodiment of the invention is shown in the accompanying drawings in which the same reference numeral is applied to the same portion throughout, but I am aware that there may be modifications thereof.

Fig. 1 is a plan view of one of the pie pans.

Fig. 2 is a side elevation of one of the pie pans with a portion shown in section to illustrate the cutter.

Fig. 3 is a plan view of one set of pie pans connected together.

Fig. 4 is a side elevation of the pan shown in Fig. 3.

Fig. 5 is a plan view of the holders to which the four pans are to be connected.

The pan is of the ordinary form with a flat bottom 1, bevel edge 2 and horizontal edge 3. However, in addition to the horizontal edge 3, it is provided with a substantially vertical edge 4.

When a series of the pans are to be connected together, each pan is provided with a hole as shown at 5 and 6 to allow the several pans to be riveted together at 7 and 8 on the frame 9; the frame 9 consists of two flat metal bars riveted together at 10, 11 and 12, while they are flared outwardly at 13 to 20 inclusive to fit the flaring edge of the pie pan.

In practice, a series of one or more of the pans is placed upon a table with their upwardly extending knife edges in contact. A sheet of dough is then spread over all of the pans. This sheet of dough is then pushed down by the workman until it touches the pan sufficiently to allow the fruit or filling for the pile to be placed in position, thereupon the sheet of dough forming the cover of the pie is placed over all of the pies, after which a roller wide enough to contact with at least one row of pies is run over the dough. This causes the cutters at the edge of the pans to cut through both layers of dough and compress them together so that they will stick at the edges when the pies are baked. The pieces of dough cut off at the edges of the pie fall on the table and after the filling the pies are lifted up and placed in the oven and the table may be scraped to remove the scraps.

What I claim is as follows, but modifications may be made in carrying out the invention shown in the drawing and in the above particularly described form thereof, within the purview of the invention.

1. In a pie pan, means for baking pies which comprises a series of pans having peripheral cutting edges and a frame comprising two members flared to fit under the edges of the pans and to which said pans are riveted, and means to secure said frames together between each pan and the adjacent pan.

2. The combination of a series of connected flared baking pans, each pan having a cutting edge surrounding it, and spaced from its flared side, whereby a series of pie bottoms and sides may be cut from a sheet of dough at one operation.

In testimony whereof I have hereunto set my hand this 30th day of Dec., A. D. 1924.

FRED S. BRISCOE.